J. C. SWAYKUS & A. TKACZ.
TRAIN PIPE COUPLING.
APPLICATION FILED NOV. 17, 1916.
1,251,837.
Patented Jan. 1, 1918.
3 SHEETS—SHEET 1.
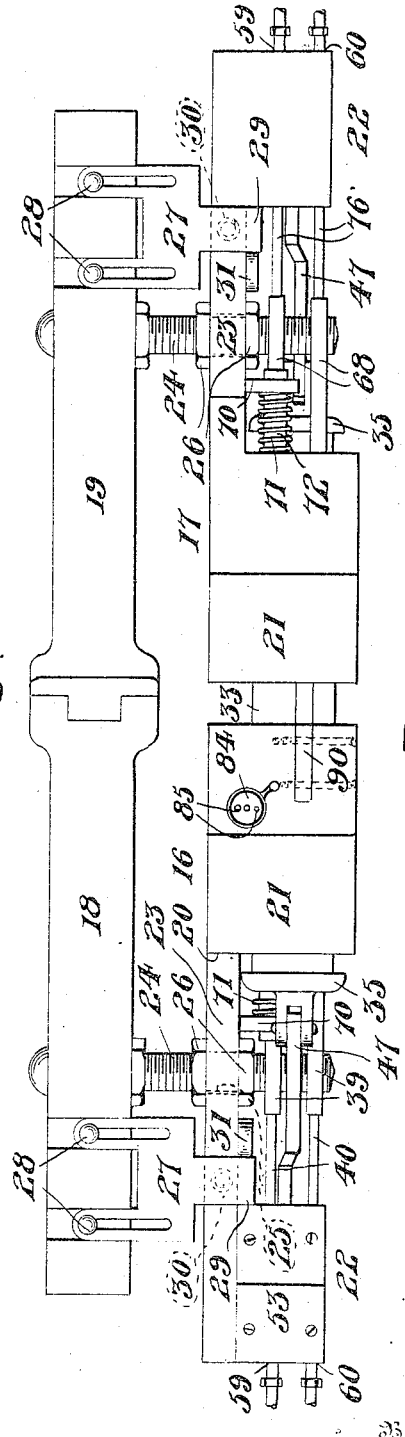
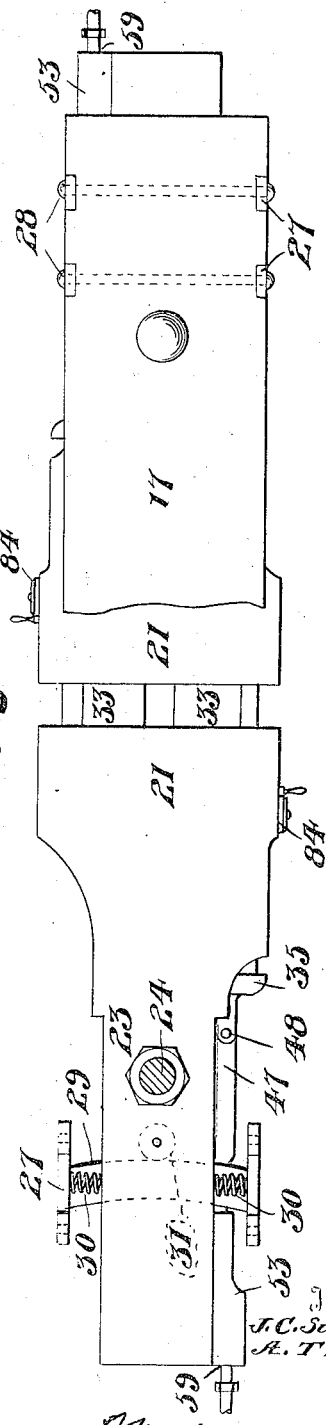
Inventors
J. C. Swaykus
A. Tkacz
Attorney

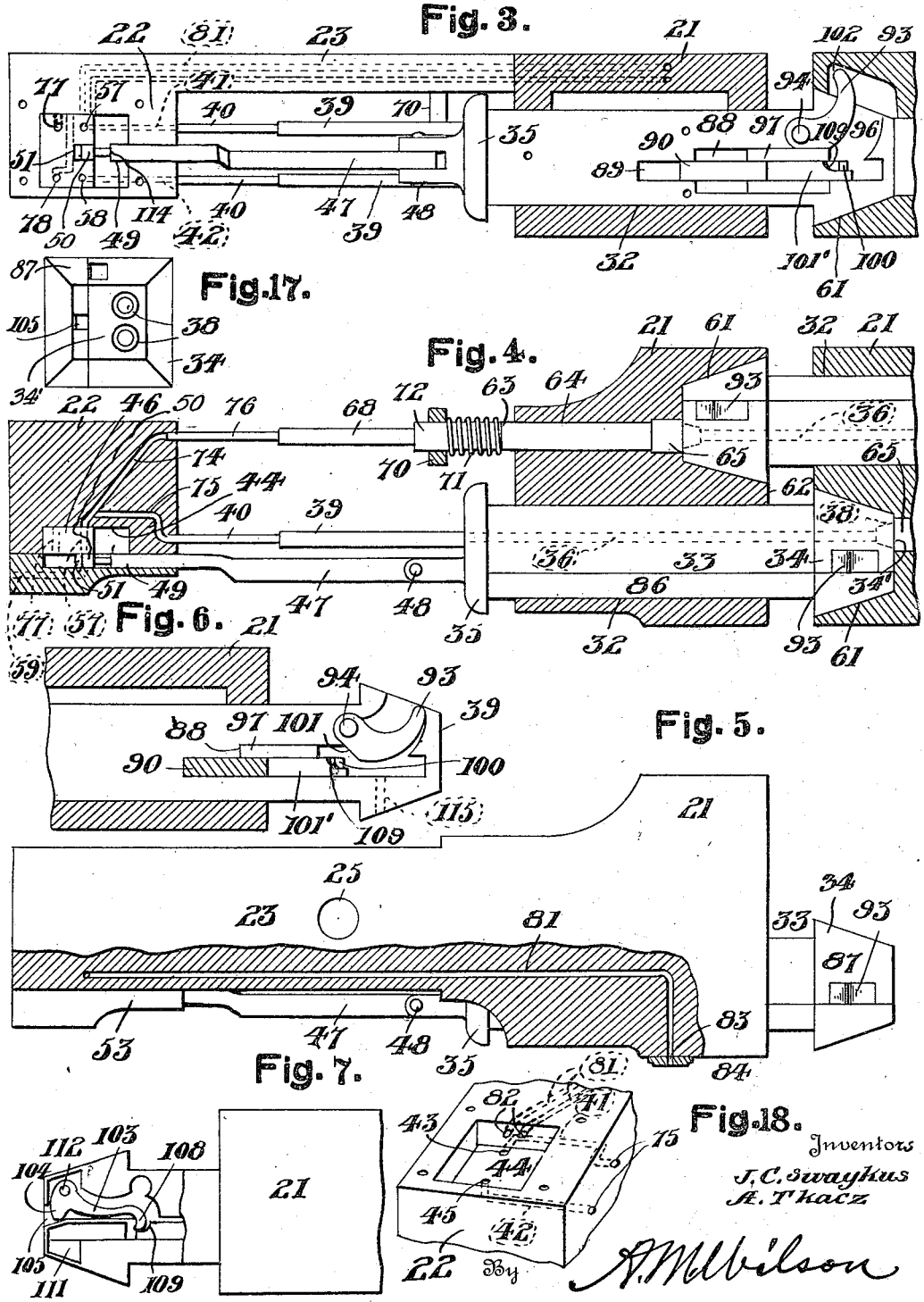

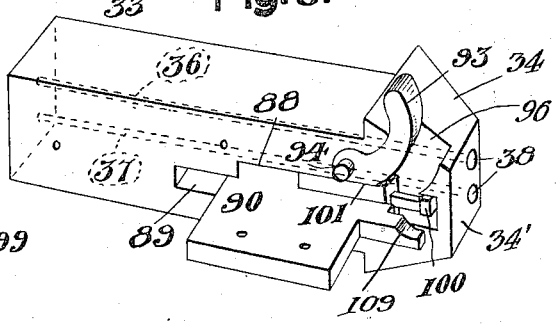
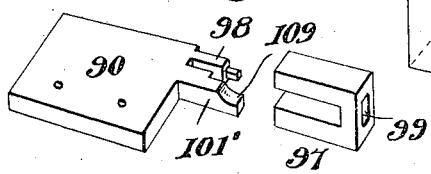
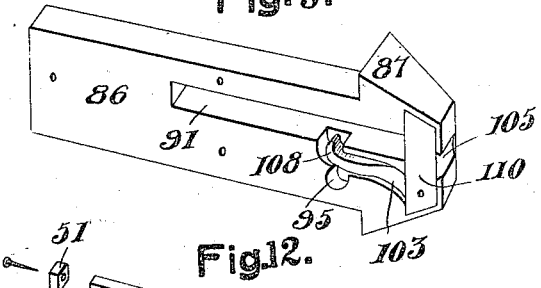
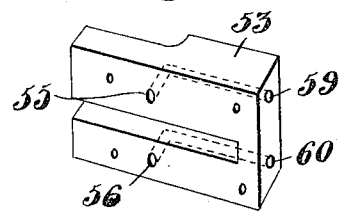
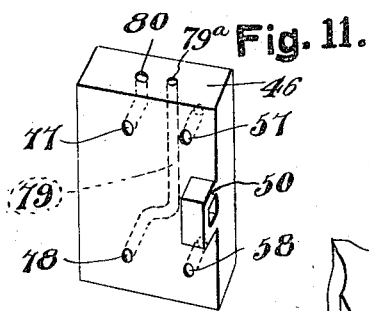
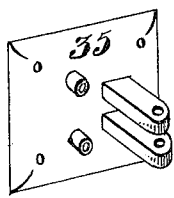
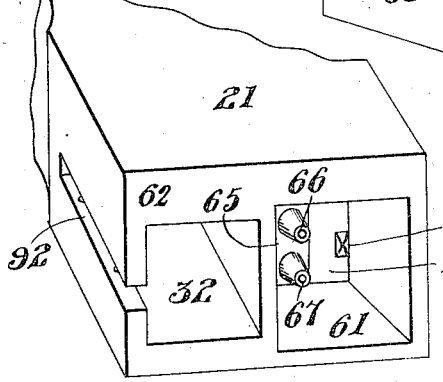

UNITED STATES PATENT OFFICE.

JOHN C. SWAYKUS AND ALEX TKACZ, OF LACKAWANNA, NEW YORK.

TRAIN-PIPE COUPLING.

1,251,837.  Specification of Letters Patent.  Patented Jan. 1, 1918.

Application filed November 17, 1916. Serial No. 131,899.

*To all whom it may concern:*

Be it known that we, JOHN C. SWAYKUS, a citizen of the United States, and ALEX TKACZ, a subject of the Emperor of Austria, residing at Lackawanna, in the county of Erie and State of New York, have invented certain new and useful Improvements in Train-Pipe Couplings, of which the following is a specification.

This invention relates to certain new and useful improvements in train pipe couplers.

The primary object of the invention is the provision of a coupler for the pipe lines of a train adapted for the accommodation of air for the brake system as well as steam or other fluid as found desirable, the coupler being arranged for effecting operative communication in such pipe lines between adjacently positioned cars.

A further object of the device is to provide a train pipe coupler which is automatic in its operation whereby the pipe lines are not only coupled together but are locked in their coupled arrangements upon connecting the cars together in the usual manner, the pipe lines being automatically opened to the coupler head when coupled but controllably opened to the atmosphere when the coupler members are disconnected.

The present structure contemplates the adjustable suspension of the train pipe couplers from the train couplers, provision being made for equalizing lateral movements of the pipe couplers under varying traffic conditions, the arrangement being such that the pipe lines upon adjacent cars are automatically connected and the lines opened when the car couplers are moved into their engaging positions, while the pipe couplers are automatically disengaged and the lines shunted to a by-pass valve when the car couplers are disconnected.

In carrying out these objects, complementally formed pipe coupler heads are arranged upon the car couplers, said pipe coupler heads having each pipe line communicating therewith sub-divided during its passage through the head providing a plurality of connecting conduits for each pipe line at the contacting end of the coupler of less diameter than the entering line, one line of each head effecting its operative connection by means of a spring-pressed double nipple within a receiving socket and the other by means of a reciprocating double nozzle projecting forwardly of the head, a slide valve being operatively attached to the said nozzle whereby both of the entering pipe lines are automatically connected to an atmosphere port controlled by a valve when the heads are uncoupled but are automatically connected operatively to the passages of the nipple and nozzle when the heads are in their coupled arrangement.

The automatically operated slide valve above referred to is advantageous upon disconnecting a car from a train in that the pipe lines of the disconnected car are opened to a single valve whereby the air and steam may be controlled as found desirable either allowed to remain in the pipe line system of the car or exhausted to the atmosphere, it being understood that the end car of the remainder of the train has its pipe lines similarly connected to a controlling valve which under ordinary conditions would remain closed upon the said car forming the extreme rear end of the pipe lines of the train.

The drawings herein illustrating the device provide designating numerals for corresponding parts throughout the same, and, Figure 1 is a side elevation of the present device suspended from the usual form of car couplers, the elements being illustrated in their operative coupled arrangements.

Fig. 2 is a top plan view thereof with one of the car couplers broken away and the other removed, one of the supporting bolts being shown in horizontal section.

Fig. 3 is a vertical longitudinal sectional view through one of the pipe coupler heads and a portion of the coöperating head, members being removed, the lines being coupled together.

Fig. 4 is a longitudinal horizontal sectional view thereof.

Fig. 5 is a top plan view of one of the pipe coupler heads detached and partially broken away.

Fig. 6 is a vertical sectional view of an end portion of one of the couplers with the nozzle in its normal uncoupled released position.

Fig. 7 is a side view of a coupler head with a side portion of the nozzle removed.

Fig. 8 is a perspective view of the nozzle detached, a side portion thereof being removed with the elements illustrated in their locked position.

Fig. 9 is a perspective view of a portion of the nozzle which is lacking in Fig. 8, the same being shown inverted.

Fig. 10 is a perspective view of two members of the locking mechanism for the nozzle.

Fig. 11 is a perspective view of the slide valve detached.

Fig. 12 is a perspective view of the connecting rod for the slide valve.

Fig. 13 is a perspective view of the cover plate for the slide valve.

Fig. 14 is a perspective view of the rear end abutment of the nozzle detached.

Fig. 15 is a perspective view of the nipple block detached.

Fig. 16 is a perspective view of an end portion of the coupler head having the nozzle mechanism removed but with the nipple block operatively positioned therein.

Fig. 17 is an elevational view of the forward end of the nozzle, and,

Fig. 18 is a perspective view of the slide valve seat.

It being understood that the present arrangement is designed for coupling together the pipe systems of a train, the device is herein illustrated in the form of two pipe coupler heads 16 and 17 depending from car couplers 18 and 19 respectively, of the Janney or any other well-known form of car coupler. The heads 16 and 17 are identically formed but oppositely positioned as arranged for relatively opposite ends of cars, each of said heads comprising a frame 20 having an inwardly positioned head proper or housing 21 and a rearwardly-arranged valve casing 22 with a top plate 23 connecting the same.

A depending bolt 24 is secured to each of the car couplers 18 and 19, one of the coupler heads being pivotally attached to each of the said bolts by means of a central perforation 25 through the plate 23. Adjusting nuts 26 are carried by each bolt 24 upon opposite sides of the plate 23 for adjusting the position of the coupler head relatively of the supporting car coupler.

An equalizer is provided for the pipe coupler heads each of which comprises a U-shaped bracket 27 adjustably attached to the adjacent car coupler by means of bolt and slot connections 28, it being understood that the connecting member 29 of such bracket is arranged horizontally in a supporting position beneath the plate 23 of the coupler while positioning springs 30 are arranged between the opposite sides of the plate 23 and the adjacent sides of the bracket 27. The bracket portion 29 is slightly arcuate in form engaging an anti-friction roller 31 upon the plate 23 and arranged between the said roller and the valve casing 22. By this arrangement it will be seen that the pipe coupler heads may accommodate themselves to the movement of the car couplers being normally maintained in their accurate longitudinal positions when released by means of the said equalizer.

The present coupling for train pipes includes two identical coupling heads oppositely positioned for coöperative engagement so that it will be necessary to specifically describe only one of the coupling heads. The housing 21 is provided with a longitudinal passage 32 extending therethrough in which a feed nozzle 33 is slidably arranged, the nozzle having a head 34 forwardly of the housing and a removable abutment 35 rearwardly thereof. Two conduits 36 and 37 are arranged through the nozzle 33 having enlarged socketed ends 38 at the free forward face 34' of the nozzle head 34, rear pipe extensions 39 being provided for the said conduits connecting by means of telescoping pipes 40 with upper and lower passages 41 and 42 respectively, in the valve casing 22. It will be understood that the upper socket 38 of the conduit 36 is thereby connected with the upper passage 41 while the lower socket 38 and the lower conduit 37 are connected with the lower passage 42 while the passage 41 terminates in a port 43 in the bottom of a rectangular valve seat 44 in the casing 22 and the passage 42 terminates in a port 45 in the bottom of said seat adjacent the said port 43. A block form of slide valve 46 is slidably arranged within the seat 44 being connected with the abutment 35 by means of a rod 47 pivotally attached as at 48 to the said abutment and having a reduced rear end 49 slidably arranged through a perforated lug 50 upon the valve 46. A stop nut 51 is secured to the free end of the extension 49 and the said extension being freely slidable within the lug 50, it will be noted that the rod 47 has a limited free movement with respect to the said valve. A closure plate 53 is provided for the valve seat opening 44 and overlies the valve 46 therein. Angular passages 55 and 56 are provided through the closure plate 53 and are adapted to position the inner ends thereof respectively, in alinement with passages 57 and 58 respectively, arranged through the said valve.

The passages 55 and 56 terminate at the rear end of the plate 53 in connecting ports 59 and 60 which are adapted to be coupled direct with the pipe lines of the car upon which the coupler is arranged. It will be understood that the air line of the train will be connected to either of the ports 59 or 60 while the other port will accommodate any other fluid pipe line carried by the train such as the steam or heating line thereof and for convenience, the upper port numbered 59 and the passages communicating therewith will be considered the air line connections while the lower port 60 and its passages through the coupler will be termed the steam line.

The housing 21 is provided with a socket 61 in its forward face 62 of a size and form adapted for the reception of the head 34 of the nozzle 33 of the adjacent coupler while the nipple block 63 is slidably arranged through a passage 64 in the housing 21 with the forward end or head 65 of the nipple block normally extending slightly within the socket 61 and having upper and lower connecting nipples 66 and 67 respectively, extending within the said socket 61 and arranged with connecting pipes 68 projecting rearwardly of the said housing. A post 70 carried by the top plate 23 of the coupler provides a seat for a helical spring 71 encircling a shoulder 72 upon the pipe 68, the forward end of the said spring being attached thereto whereby the nipple block 63 has its head 65 normally resiliently projected slightly within the socket 61. The passages 41 and 42 of the valve casing 22 are each branched within the said casing forming diverging branches 74 and 75, to which branch 75 of each of said passages 41 and 42, the pipes 40 are fixedly arranged for telescoping with the pipes 39 of the conduits 36 and 37 while the opposite branches 74 are arranged with similar upper and lower pipes 76 telescoping with the pipes 68 of the nipple block 63. By this arrangement it will be understood that the upper port 43 with which the valve port 57 is adapted to register for connecting the passage 41 with the air inlet 59 divides the air supply conducting a portion thereof through the conduit 36 of the nozzle 33 to the upper forward socket 38 thereof while the remainder of the air passes through the upper pipe 68 of the nipple block 63 to the upper nipple 66 within the socket 61. Similarly the steam entering the port 60 is communicated to the port 45 of the valve seat when the valve port 58 registers therewith, allowing the steam to enter the passage 42 to be separated into two streams passing through the nozzle and the nipple as set forth. It will be also noted that the ports 59 and 60 of the valve casing 22 will either form inlet or outlet ports according to the direction in which the fluid is passing through the coupling.

Under normal running conditions, the valve 46 is positioned as best shown in Figs. 3 and 4 of the drawings with the ports 57 and 58 in communication between the ports 55, 56 and the ports 43, 45 respectively, but by means of the mechanism hereinafter described, the said valve will be automatically forwardly shifted when the present coupler is uncoupled, thereby closing the ports 43 and 45 leading to the passages through the coupler. Such forward position of the valve 46 will cause the ports 77 and 78 of the valve to register with the ports 55 and 56 respectively, of the plate 53. The port 77 communicates with a transverse passage in the valve 46 outletting at one side thereof in a port 80, while the port 78 communicates with the transverse passage 79 outletting at one side thereof in a port 79$^a$. Auxiliary passages 81 are arranged through the coupler as best illustrated in Figs. 3 and 5 of the drawings extending through the casing 22, the plate 23 and housing 21 with their rear ends terminating in ports 82 in the upper side of the valve seat 44 laterally of the port 43 while the forward end of the passages 81 terminate as at 83 at one side of the housing 21. A hand rotating valve 84 is pivoted upon the said housing having a pair of exhaust openings 85 therein adapted to register with the ports 83 whenever it is desired to exhaust the air and the steam from the pipe lines of the car when the valve 46 is positioned for such purpose in the manner above noted. It will be understood that when uncoupling the rear car from a train the air and steam from the uncoupled car may then be readily exhausted to the atmosphere by opening the valve 84 while the rear car remaining upon the train will have both fluid lines thereof closed at the rear ends by closing the valve 84.

The nozzle 33 is provided with a side cover section 86 having a head portion 87 forming a part of the nozzle head 34. A chamber 88 is arranged within the nozzle having a slot portion 89 adapted to receive an anchor block 90, the latter freely projecting through a slot 91 in the side section 86 and secured within a slot 92 in the adjacent side of the housing 21. An engaging hook 93 has a pintle 94 journaled in oppositely-arranged sockets 95 in the two sections forming the said nozzle, the free end of the hook 93 being adapted to project through a passage 96 in the upper oblique face of the nozzle head 34. A lock yoke 97 spans the anchor 90, being shiftably arranged relatively thereof and loosely attached thereto by means of a stem 98 projecting through an opening 99 in the forward end of the yoke and retained thereon by a nut 100 secured to the free end of the stem. When the nozzle is rearwardly positioned, it being understood that the anchor 90 is fixed to the housing 21, the yoke 97 will be thrust beneath the squared lower face 101 of the hook 93 thereby maintaining the hook elevated for engagement within a keeper pocket 102 provided in the upper side of the receiving socket 61 of the adjacent coupler head. The free connection between the said yoke and anchor allows the nozzle slight longitudinal movement within the housing without influencing the yoke 97, whereby the hook 93 remains locked with the adjacent coupler during slight movements of the nozzle, the locking position of the elements being best illustrated in Figs. 3 and 8 of the drawings. Upon moving the nozzle to its extreme forward position it will be seen that the yoke 97 being entirely removed from the face 101 of the hook 93, the hook will be free to swing downwardly within the opening 96 by reason of its own weight thereby automatically unlocking the coupler heads upon forcibly pulling the couplers apart, such for instance, as during the uncoupling of the train couplers 18 and 19.

A means is provided for retaining the nozzle 33 at the forward limit of its movement until released, the same consisting of a curved latch 103 pivoted within the side section 86 of the nozzle and having a heel 104 arranged adjacent an opening 105 in the forward end of the nozzle, said opening being adapted to receive a tripping lug 106 mounted upon the inner squared end 107 of the housing socket 61. A toe 108 is arranged at the inner rear end of the latch 103 resting within a curved seat 109 upon the adjacent free end portion 101' of the anchor 90 when the nozzle is forwardly positioned, the said extension 101' being slidably arranged within the aforementioned slot 91 of the section 86. A countersunk cover 110 is provided upon a seat 111 of the section head 87 for overlying the pivotal connection 112 of the latch 103. Upon bringing together the two couplers 16 and 17 with the nozzles 33 thereof forwardly projected, the nozzle head 34 of one housing enters the socket 61 of the adjacent housing whereupon the lug 106 entering the opening 105 elevates the end 108 of the latch 103 out of contact with the curved seat 109 of the anchor plate extension 101', allowing the nozzles to move rearwardly, which action engages the yoke 97 with the hooks 93 for seating within the keeper sockets 102 of the housings of the adjacent coupler, thereby locking the couplers together in their operative arrangements, it being understood that the spring 71 of each of the nipple blocks 63 resiliently engages the nipples 66 and 67 within the upper and lower sockets 38 respectively, of the nozzle heads 34. The slide valve 46 of each head being positioned forwardly within the seat 44 when the nozzle is forwardly arranged, such operative engagement of the heads engages the shoulder 114 of the rod 47 with the lug 50 upon the rearward movement of the nozzle, thereby shifting the valve 46 rearwardly and opening the inlet air and steam ports 59 and 60 respectively with the air and steam passages 41 and 42 respectively of the valve casing 22. An outlet 115 is provided in the nozzle 33 for allowing any water to escape which may have accumulated in the chamber 88 thereof.

The complete operation of the device will be apparent from the foregoing detailed description of all of the parts thereof as well as their operations and functions, it being only necessary to note in addition that the present pipe line coupler is entirely automatic in its operation preventing any unnecessary waste in the fluid transmitted therethrough and serving all the purposes for which such a coupler is intended, it being understood that additional conducting passages may be arranged therethrough in a similar manner if desired for the accommodation of other fluid, such as hot and cold water and that electric wiring conduits may also be accommodated by the coupler having plug terminal connections.

The present form of the device as now illustrated is believed to be preferable although it will be understood that changes may be made therein if found desirable without departing from the spirit and scope of the present invention.

What we claim as new is:—

1. A train pipe coupler comprising in combination with car couplers, pipe coupler heads shiftably suspended therefrom, fluid conduits tapped into the rear ends of said heads, the said heads having a plurality of passages therethrough terminating with each of said conduits and fluid-tight interengaging conducting members for said passages carried by said heads, and including a nipple block and nozzle each having a pair of passages therethrough.

2. A train pipe coupler comprising two similar oppositely positioned coupler heads, each of the said heads having two fluid inlet ports at its rear end, and being further provided with branching passages therethrough for each of said ports, the said passages opening at the forward end of the head, and communicating with a nipple block and a nozzle, each having a pair of passages therethrough.

3. A train pipe coupler comprising cooperating heads consisting of a valve casing and a housing connected together, air and steam connections for said valve casing, the said casing and housing having branch passages therethrough for each of said air and steam connections terminating adjacent the forward end of the housing, a nipple block and nozzle at the forward end of the housing each having air and steam passages therethrough.

4. A pipe coupler comprising a head having a valve casing and a housing arranged in spaced relations, a nipple block and a nozzle slidably arranged through the said housing, each of the same having an upper and a lower passage therethrough, and connections for the said passages communicating with the said casing, and adapted for the reception of fluid through the latter.

5. A train pipe coupler comprising two similar oppositely positioned heads, fluid conduits attached to the opposite ends of said heads, nipple blocks and nozzles each having a plurality of passages therethrough carried by said heads adjacent opposite sides thereof with the nozzle of one head engaging the nipple block of the other head when the device is coupled, and a plurality of fluid conductors arranged between each of said conduits and the nipple blocks and nozzles.

6. A train pipe coupler comprising in combination with engaging car couplers, heads carried by said couplers having complementally formed adjacent faces, means for locking said heads together, loosely connected, with fluid-tight engaging faces therebetween, said heads adapted for automatic releasing and disengagement upon a separation of said car couplers, and locking means for the heads including a pair of pivoted levers and sliding mechanism for operating the same.

7. A train pipe coupler comprising heads suspended from the car couplers of the train, each of the said heads having a receiving recess oppositely arranged with respect to the sides of the heads, a spring-pressed nipple block carried by each head, normally projecting within the recess of such head, a reciprocating nozzle carried by each head, having an enlarged end arranged within the recess of the adjacent head, when the car couplers are coupled together, each of said nozzles and nipple blocks having an upper and a lower passage therethrough, and an upper and a lower inlet pipe carried by each of said heads communicating with the upper passages of said nozzle and nipple block and the lower passages thereof, respectively.

8. A train pipe coupler comprising heads suspended from the car couplers of the train, each of the said heads having a receiving recess oppositely arranged with respect to the sides of the heads, a spring-pressed nipple block carried by each head, normally projecting within the recess of such head, a reciprocating nozzle carried by each head, having an enlarged end arranged within the recess of the adjacent head, when the car couplers are coupled together, each of said nozzles and nipple blocks having an upper and a lower passage therethrough, a valve casing connected to each of said heads, having an upper and a lower inlet port and valve-controlled upper and lower branch passages extending therethrough, and compensating fluid connecting means between the upper and lower passages of said casing and the upper and lower passages, respectively, of said nozzle and nipple block.

9. A pipe line coupler for cars comprising a head attached to each coupler member of the adjacently positioned cars, each head having a nozzle and nipple block positioned therein and provided with a pair of passages, an air pipe attached to the rear end of each head, each head having two passages therethrough connecting with the air pipe thereof at one end and opening in coöperative relations with the nozzle and nipple block passages, a valve means adapted for controlling passages within the said heads automatically closed when the heads are disconnected.

10. A pipe line coupler for cars comprising engageable heads, pipe lines connected to the said heads, fluid conducting means for the said lines arranged longitudinally of the heads, a controlling slide valve for the said conducting means, operating means for said valve including a nozzle slidably mounted in the head whereby the said conducting means are in communication with the pipe lines when said heads are in engagement and such communication being automatically broken when such engagement between the heads is broken.

11. A pipe coupler for cars comprising heads adapted for attachment to the couplers of the cars, comprising heads having rear portions provided with fluid passages therethrough, the said heads having auxiliary conduits, slidable nipple blocks and nozzles coöperatingly carried by said heads having passages adapted to communicate with the said rear passages and means operatively attached to the nozzles whereby the said auxiliary conduits are automatically arranged in communication with the pipe line of the carrying car when the couplers of the cars are disconnected.

12. A nozzle for train pipe couplers comprising a body having a chamber therein, an anchor member extending within said chamber, a cover plate for the latter, having a slot through which the anchor extends, and further having an opening in its forward end, a pivoted latch within said plate having one end abuttingly arranged with respect to said anchor and its opposite end lying inwardly of said opening, a locking yoke slidably overlying said anchor within the chamber and a locking hook pivotally carried by the body within the restraining path of movement of said yoke.

13. A train pipe coupler comprising complementally formed interengaging heads, each including a body portion, and a nozzle and a nipple block slidably mounted therein for limited movements, said nozzle and nipple block having a pair of fluid passages therethrough, and a source of fluid supply and valve mechanism for regulating the fluid supply carried by said head and automatically operated by said sliding nozzle when said heads are coupled and uncoupled.

14. A train pipe coupler comprising complementally formed interengaging heads, each including a body portion, and a nozzle and a nipple block slidably mounted therein for limited movements, said nozzle and nipple block having a pair of fluid passages therethrough, and a source of fluid supply and valve mechanism for regulating the fluid supply carried by said head and automatically operated by said sliding nozzle when said heads are coupled and uncoupled, said nozzle having a limited sliding connection with said valve to permit a limited movement thereof previous to the operation of said valve.

15. A train pipe coupler comprising complementally formed interengaging heads each including a body portion, and a nozzle and a nipple block slidably mounted therein for limited movements, said nozzle and nipple block having a pair of fluid passages therethrough, and a source of fluid supply and valve mechanism for regulating the fluid supply carried by said head and automatically operated by said sliding nozzle when said heads are coupled and uncoupled, the said valve carrying an apertured block through which the stem carried by said nozzle is adapted to project for limited sliding movement.

16. A pipe coupler comprising a head having a valve casing and a housing arranged in spaced relations, a nipple block and a nozzle slidably arranged through the said housing, each of the same having an upper and a lower passage therethrough, and connections for said passages communicating with the said casing, and adapted for the reception of fluid through the latter, the said nipple block having means associated therewith for resiliently supporting the same.

17. A train pipe coupler including complementally formed heads, each including a body portion, a nipple block and nozzle slidably positioned therein, fluid supply means therefor, a valve automatically operated by said nozzle for regulating the supply of the fluid, and means carried directly by said nozzle adapted to be operated during coupling and uncoupling of the head to lock and disengage respectively, the heads.

18. A train pipe coupler including complementally formed heads, each including a body portion, a nipple block and nozzle slidably positioned therein, fluid supply means therefor, a valve automatically operated by said nozzle for regulating the supply of the fluid, and means carried directly by said nozzle adapted to be operated during coupling and uncoupling of the head to lock and disengage respectively, the heads, the said means including a pivoted lever engaging the opposed head and an anchor plate fixed to said head and slidably extending through said nozzle for engagement and disengagement with said pivoted lever.

19. A train pipe coupler including complementally formed heads, each including a body portion, a nipple block and nozzle slidably positioned therein, fluid supply means therefor, a valve automatically operated by said nozzle for regulating the supply of the fluid, and means carried directly by said nozzle adapted to be operated during coupling and uncoupling of the head to lock and disengage respectively, the heads, the said means including a pivoted lever engaging the opposed head and an anchor plate fixed to said head and slidably extending through said nozzle for engagement and disengagement with said pivoted lever, and means carried by said nozzle adapted to engage said anchor plate to hold the same at its limit of movement in one direction when the heads are uncoupled.

20. A train pipe coupler including complementally formed heads, each including a body portion, a nipple block and nozzle slidably positioned therein, fluid supply means therefor, a valve automatically operated by said nozzle for regulating the supply of the fluid, and means carried directly by said nozzle adapted to be operated during coupling and uncoupling of the head to lock and disengage respectively, the heads, the said means including a pivoted lever engaging the opposed head and an anchor plate fixed to said head and slidably extending through said nozzle for engagement and disengagement with said pivoted lever, and means carried by said nozzle adapted to engage said anchor when the heads are uncoupled, and means carried by the opposed head adapted to engage said last named means to render the same inoperative during coupling movement of the heads.

In testimony whereof we affix our signatures.

JOHN C. SWAYKUS.
ALEX TKACZ.

Copies of this patent may be obtained for five cents each, by addressing the "Commissioner of Patents, Washington, D. C."